(12) United States Patent
Scarmozzino (10) Patent No.: US 8,760,108 B2
(45) Date of Patent: Jun. 24, 2014

(54) PHOTOVOLTAIC HANDBAG AND SYSTEM

(75) Inventor: LuAnn Scarmozzino, Cortlandt Manor, NY (US)

(73) Assignee: My Solar LLC, New York, NY (US)

( * ) Notice: Subject to any disclaimer, the term of this patent is extended or adjusted under 35 U.S.C. 154(b) by 288 days.

(21) Appl. No.: 13/116,442

(22) Filed: May 26, 2011

(65) Prior Publication Data

US 2012/0299528 A1 Nov. 29, 2012

(51) Int. Cl.
*H01M 10/44* (2006.01)
*H01L 31/042* (2014.01)
*H01L 31/00* (2006.01)

(52) U.S. Cl.
USPC .............................. 320/101; 136/244; 136/257

(58) Field of Classification Search
USPC .................................... 320/101; 136/244, 257
See application file for complete search history.

(56) References Cited

U.S. PATENT DOCUMENTS

| | | | | |
|---|---|---|---|---|
| 1,978,971 | A * | 10/1934 | Thornhill et al. | 150/129 |
| 5,701,067 | A * | 12/1997 | Kaji et al. | 320/101 |
| 5,842,535 | A | 12/1998 | Dennis | |
| 7,607,461 | B2 * | 10/2009 | Pace et al. | 150/105 |
| 2004/0011840 | A1 * | 1/2004 | Lovett | 224/584 |
| 2005/0135083 | A1 | 6/2005 | Tait | |
| 2005/0140331 | A1 * | 6/2005 | McQuade | 320/101 |
| 2006/0061546 | A1 | 3/2006 | Jong | |
| 2006/0272969 | A1 | 12/2006 | Hartstein et al. | |
| 2006/0273757 | A1 | 12/2006 | Naguib | |
| 2007/0222410 | A1 | 9/2007 | Lee | |
| 2007/0279002 | A1 | 12/2007 | Partovi | |
| 2008/0011799 | A1 | 1/2008 | Chang | |
| 2008/0078794 | A1 * | 4/2008 | Fletcher et al. | 224/616 |
| 2008/0157711 | A1 | 7/2008 | Chiang et al. | |
| 2008/0210728 | A1 | 9/2008 | Bihn | |
| 2009/0003820 | A1 | 1/2009 | Law et al. | |
| 2009/0167237 | A1 * | 7/2009 | Tsai et al. | 320/101 |
| 2009/0224722 | A1 | 9/2009 | Causey | |

OTHER PUBLICATIONS

PCT International Search Report from corresponding application PCT/US2012/039361 mailed Jan. 23, 2013.

* cited by examiner

*Primary Examiner* — M'Baye Diao
(74) *Attorney, Agent, or Firm* — Carter, DeLuca, Farrell & Schmidt, LLP (57) ABSTRACT

A bag includes a frame having a base, a pair of side walls, and a pair of end walls. The base, side walls, and end walls are engaged to one another to define an interior portion accessible via an open end of the frame. An inner lining is removably positionable within the frame and an outer jacket is removably positionable about the frame. The outer jacket is configured to engage the inner lining adjacent the open end of the frame to secure the outer jacket and the inner lining about the frame. A solar charging unit is mountable on the frame. The solar charging unit includes one or more solar cell arrays and one or more energy storage devices. The solar charging unit is configured to provide charging power to one or more portable electronic devices coupled thereto.

4 Claims, 6 Drawing Sheets

PHOTOVOLTAIC HANDBAG AND SYSTEM

BACKGROUND

1. Technical Field

The present disclosure relates to handbags and, more particularly, to an environmentally friendly handbag including interchangeable components and a solar charging unit for charging electronics, e.g., a cell phone, stored in the handbag.

2. Description of Related Art

It is now commonplace for people to rely on portable electronics, e.g., cell phones, PDA's, smartphones, digital music players, cameras, and the like, for business and personal communications, entertainment, news, etc. As a result of this reliance on portable electronics, it has become increasingly important to develop convenient and accessible systems for charging these electronics while on the go. Accordingly, totebags, backpacks, and handbags have been developed which incorporate battery charging systems for charging portable electronics. For example, U.S. Patent Application Publication No. 2008/0011799 discloses a solar energy backpack configured to convert solar energy, i.e., light rays, into electrical energy for storage in one or more storage devices contained within the backpack. Portable electronics carried within the backpack may be coupled to the storage device(s) for charging such electronics during transport.

However, while the reliance on portable electronics has significantly increased in the past several years, awareness of the environmental implications resulting from the manufacture and use of products, materials, and resources has also significantly increased in the past several years. Thus, it would be desirable to provide a handbag made from environmentally-friendly, natural materials that is also capable of charging portable electronic devices using renewable resources, e.g., solar energy. Further, it would be desirable if such a handbag were interchangeable and customizable through the use of various natural and/or recycled components and materials such that creativity, personalization, style, functionality, and environmental friendliness are not sacrificed at the expense of one another.

SUMMARY

In accordance with one embodiment of the present disclosure, a bag is provided. The bag includes a frame having a base, a pair of side walls, and a pair of end walls. The base, side walls, and end walls are engaged to one another to define an interior portion of the frame that is accessible via an open end of the frame. An inner lining is removably positionable within the interior portion of the frame, while an outer jacket is removably positionable about the frame. The outer jacket is configured to engage the inner lining adjacent the open end of the frame to secure the outer jacket and the inner lining about the frame. A solar charging unit is mountable on the frame and includes one or more solar cell arrays and one or more energy storage devices that, together cooperate to provide charging power to one or more portable electronic devices when coupled thereto.

In one embodiment, the frame is formed from cork. The cork base, side walls, and end walls may be sewn together to define the frame. Further, a plurality of feet may be disposed the base of the frame to support the frame above the ground. The frame may also include a pair of carrying straps engaged thereon.

In another embodiment, the solar cell array(s) is formed from monocrystalline silicon, polycrystalline silicon, amorphous silicon, cadmium telluride, copper indium gallium selenide (CIGS), or organic solar cells. Further, the solar cell arrays may be formed from recycled solar panels, e.g., larger roof-mounted or standalone solar panels that have been repurposed.

In yet another embodiment, the energy storage device includes one or more hydrofuel cell packs, NiMh battery packs, or lithium ion battery packs.

In still another embodiment, the outer jacket and inner lining are engagable with one another via buttoning. Alternatively or additionally, the outer jacket and inner lining may be engaged to one another via ribboning, or any other suitable mechanism.

In yet another embodiment, an exterior pocket is mountable on the frame. The energy storage device may be coupled to the exterior pocket such that the portable electronic device(s) are positionable within the exterior pocket for charging the portable electronic device(s). The energy storage device may have one or more ports thereon for connecting a portable electronic device and charging its battery. Alternatively, the exterior pocket may include an inductive charging plate disposed therein for charging the portable electronic device(s) via inductive charging when the electronic device is placed in the pocket.

Another embodiment of a bag provided in accordance with the present disclosure includes a cork frame having a base, a pair of side walls, and a pair of end walls that are all sewn together to define an interior portion of the frame that is accessible via an open end of the frame. An inner lining formed from natural textiles is disposed within the interior portion of the frame, while an outer jacket formed from natural textiles is disposed about the frame. A solar charging unit is mounted on the frame and includes one or more solar cell arrays and one or more reusable energy storage devices. The solar cell arrays are formed from recycled solar cell panels, e.g., larger roof-mounted or standalone solar panels. The bag may further be configured similar to any of the previous embodiments.

A kit for assembling, customizing, and/or interchanging components of a handbag is also provided in accordance with the present disclosure. The kit includes a bag frame, a plurality of inner linings, a plurality of outer jackets, and a solar charging unit. The inner linings each define a different configuration and are positionable within the frame. As such, the user may select a desired inner lining for positioning within the frame. Each outer jacket also defines a different configuration and is positionable about the frame. The outer jackets are configured to engage each of the inner linings for engaging the outer jacket and inner lining to one another about the bag frame. In other words, any combination of inner linings and outer jackets may be used, depending on a desired configuration. The solar charging unit includes one or more solar cell arrays mountable on the frame and one or more energy storage devices mountable on the frame. The solar charging unit further includes at least one connection member for coupling one or more portable electronic devices to the solar charging unit for charging.

In one embodiment, one of the connection members is an inductive charging plate. The other connection members may include standard connection cables, e.g., USB cables, or cables specific to particular electronic devices or types of devices.

In another embodiment, the kit also includes one or more pockets that are mountable on the frame. The pocket(s) is configured to receive the portable electronic device(s) therein to facilitate charging of the portable electronic device(s).

In yet another embodiment, the frame is formed from cork to facilitate mounting the solar cell array(s) and the energy storage device(s) thereto.

BRIEF DESCRIPTION OF THE DRAWINGS

Various illustrative embodiments of the present disclosure are described herein with reference to the drawings, wherein.

DETAILED DESCRIPTION

Figure 1A:
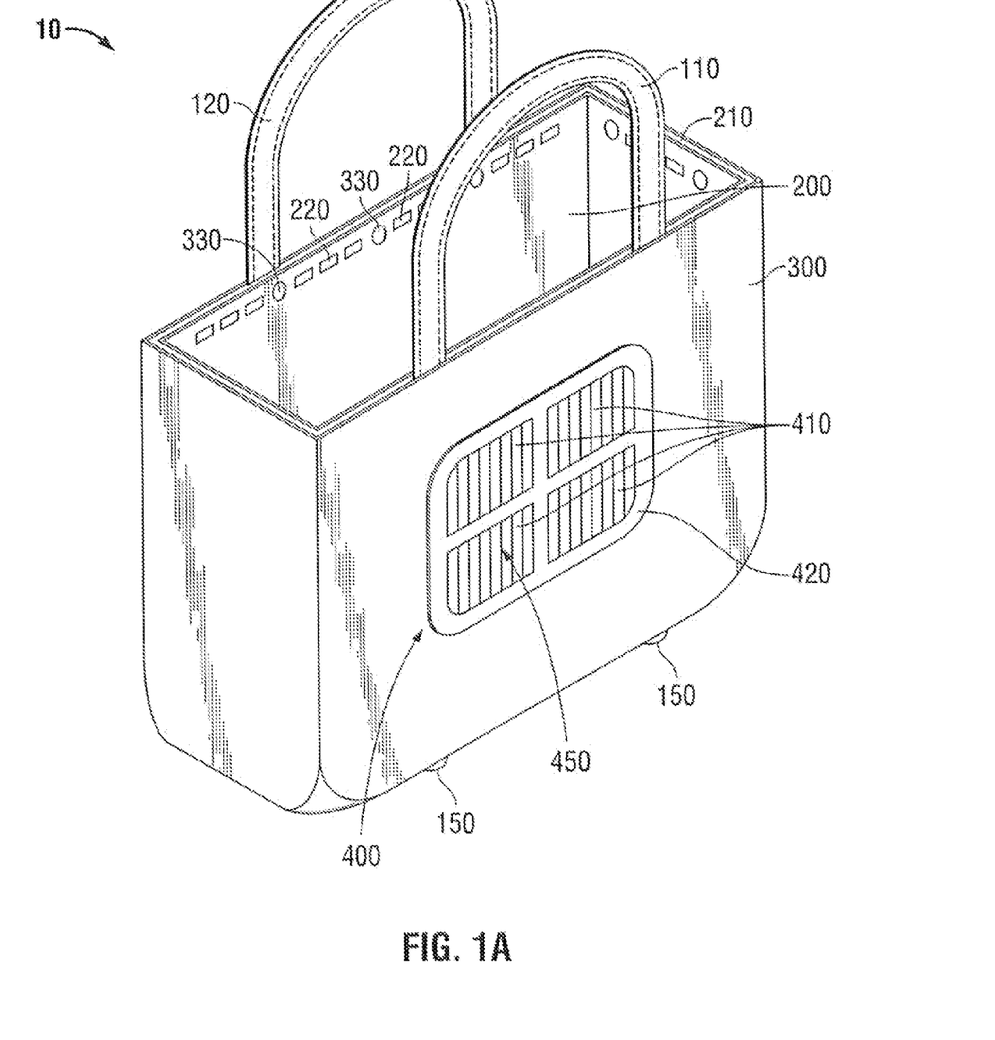
FIG. 1A is a perspective view of a first side of a handbag provided in accordance with the present disclosure.
Figure 1B:
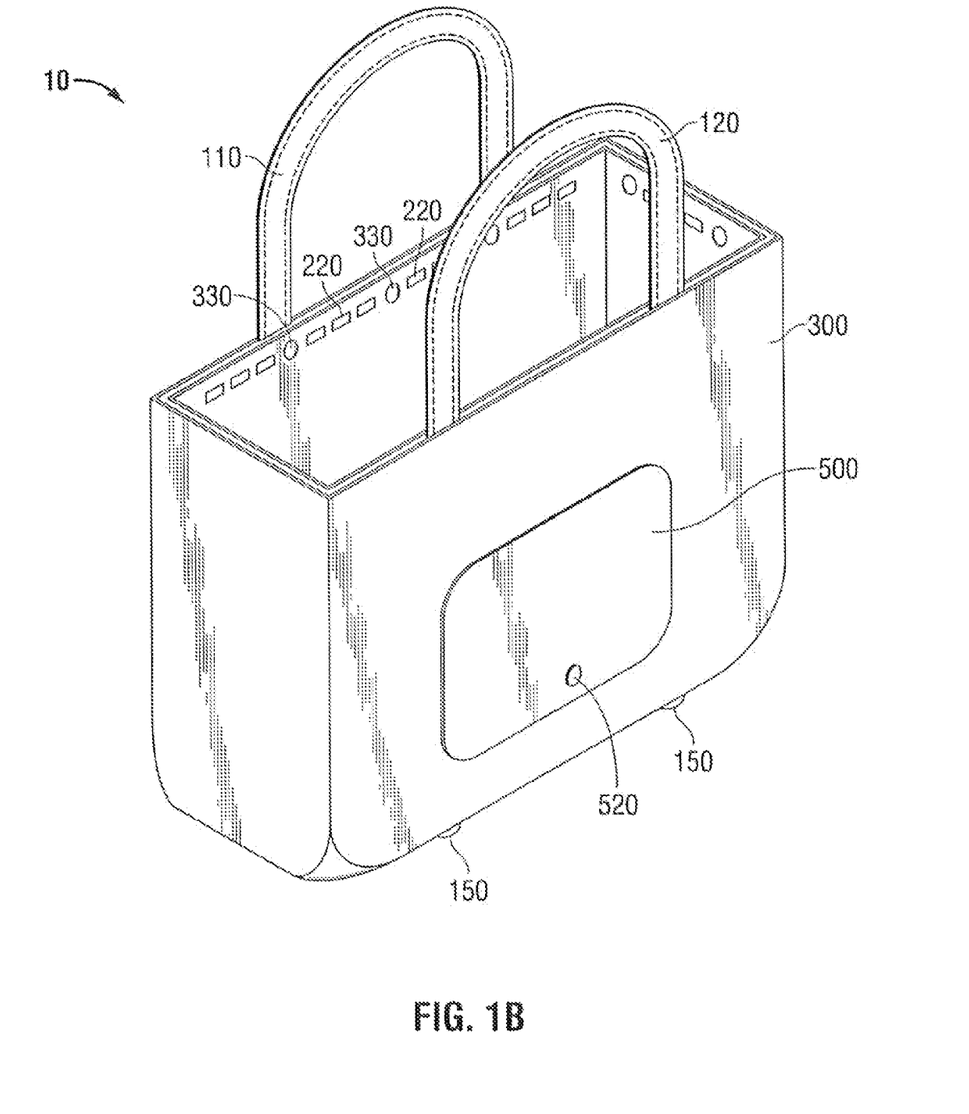
FIG. 1B is a perspective view of a second side of the handbag of FIG. 1A.
Figure 2:
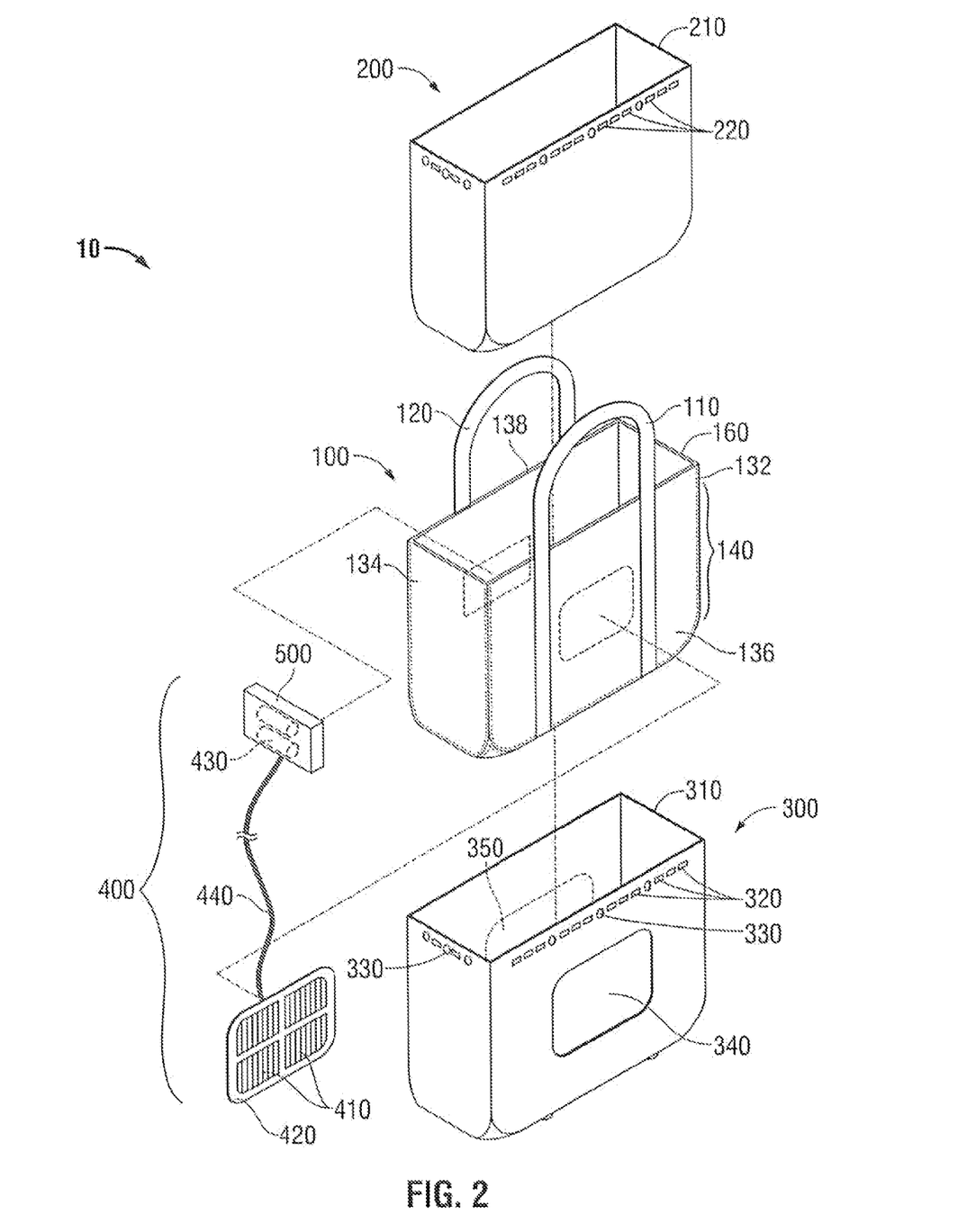
FIG. 2 is a side, perspective view of the handbag of FIG. 1A shown with parts separated.

Turning now to FIGS. 1A, 1B and 2, a purse, or handbag provided in accordance with the present disclosure is shown generally identified by reference numeral 10. Although exemplified primarily with respect to handbag 10, it is envisioned that the principles and novel features of the present disclosure, described hereinbelow, may similarly be adapted for use in conjunction with any suitable tote, e.g., shoulder bags, briefcases, courier bags, etc. For example, as will be described below, the present disclosure may also relate to lunch bags, food and beverage bags, or other bags requiring insulation and/or refrigeration for food and drink, e.g., a mother's bag including sections or compartments for maintaining food, drinks, bottles, etc. in a cooled or refrigerated state. Further, the features of such embodiments may also be incorporated into handbag 10 to provide a refrigeration section, or compartment formed within handbag 10 for similar purposes.

As shown in FIGS. 1A, 1B and 2, handbag 10 generally includes a frame 100, a pair of opposed carrying straps 110, 120, an inner lining 200, an outer jacket 300, a solar charging unit 400, and an exterior pocket 500. Frame 100 provides structural support and strength to handbag 10 and functions as a mounting frame for securing the various components of handbag 10 thereto or thereabout, as will be described in greater detail below. Frame 100 may be formed from any suitable renewable natural material, e.g., cork. A cork frame 100 is advantageous in that cork provides sufficient structural support to substantially maintain the shape of handbag 10, while also providing some degree of flexibility (depending on the thickness of the cork frame 100) and compressibility, which helps absorb the impact of external forces acting on handbag 10, e.g., upon dropping handbag 10, thereby protecting the contents of handbag 10. Cork also provides a convenient and sufficiently strong mounting structure for securing various different components, e.g., solar charging unit 400, to frame 100 at almost any position thereon, provides some degree of waterproofing to protect the contents and components of handbag 10, and acts as an insulator to moderate the internal temperature of handbag 10. Further, frame 100 may include a mesh (not explicitly shown) disposed thereabout for providing additional support to the cork frame 100.

Frame 100, as best shown in FIG. 2, may include a base 130, a pair of end walls 132, 134, and a pair of side walls 136, 138 that are interconnected, e.g., sewn together via stitching 140 or, alternatively, glued together with a natural non-toxic glue or other adhesive known in the art, to form a generally rectangular box-shaped configuration including an interior portion accessible from open end 160 of frame 100, although other configurations are contemplated. Further, the flexibility of cork also allows frame 100 to be configured in various non-linear configurations, e.g., cylindrical, curved-edged, etc, as desired. Base 130 may include a set of feet 150, e.g., four (4) feet 150, extending outwardly therefrom for supporting frame 100 above an external surface, e.g., the ground. Feet 150 may be formed from natural materials including cork, Tagua nut, or other suitable natural materials. Carrying straps 110, 120 are sewn, or otherwise secured onto the opposed side walls 136, 138, respectively, of frame 100, or at any other desired position therealong, to facilitate transport of handbag 10. Alternatively, carrying straps 110, 120 may be releasably engagable with frame 100, e.g., via buttons, latches, etc., and/or may be inserted through loops of material (not shown) sewn onto frame 100 to facilitate the interchanging of carrying straps 110, 120. In one preferred embodiment, straps 110, 120 are formed as a single piece of material that includes two continuous loops disposed on either side of the handbag 10. Carrying straps 110, 120 may be formed from any suitable natural material, e.g., woven materials.

With continued reference to FIGS. 1A, 1B and 2, inner lining 200 is formed from any suitable natural materials, e.g., natural textiles such as hemp, organic cotton, wool, etc. and is configured to line the interior of frame 100. As will be described below, inner lining 200 may include dividers, compartments, pouches, or the like, to facilitate organization of and access to the contents of handbag 10. Further, inner lining 200 may include a plurality of apertures 220, buttons (not shown), fasteners (not shown), etc. disposed about open end 210 thereof for releasably engaging inner lining 200 to frame 100 and/or outer jacket 300. Apertures 220, for example, may be configured to receive a ribbon (not shown) and/or buttons 330 (FIG. 2) of outer jacket 300 therethrough for engaging inner lining 200 and outer jacket 300 to one another.

Outer jacket 300 is configured for disposition about frame 100 to define the exterior of handbag 10. Outer jacket 300 may be configured to extend about the entire exterior of frame 100, e.g., outer jacket 300 may cover base 130, end walls 132, 134, and side walls 136, 138, or may only extend about end and side walls 132, 134 and 136, 138 respectively, such that base 130 of frame 100 remains exposed. Additionally, outer jacket 300 may include a flap, or cover (not explicitly shown) configured to extend across open end 160 of frame 100 to completely enclose frame 100, thus inhibiting theft or inadvertent loss of the contents of handbag 10.

Similar to inner lining 200, outer jacket 300 may be formed from natural materials, e.g., hemp, organic cotton, wool, etc. Outer jacket 300 also includes apertures 320, buttons 330 and/or fasteners (not shown) disposed about open end 310 thereof for releasably engaging outer jacket 300 to frame 100 and/or inner lining 200. Outer jacket 300 may further include one or more windows 340, 350 defined therethrough for receiving solar charging unit 400 and external pocket 500, respectively, therethrough, and/or a plurality of apertures (not explicitly shown) configured to permit extension of feet 150 from base 130 of frame 100 therethrough. More specifically, the apertures (not explicitly shown) formed in the bottom surface of outer jacket 300 may correspond to the location of feet 150. Further, by reinforcing the apertures (not explicitly shown), outer jacket 300 may be tightly secured to both the bottom of handbag 10, e.g., due to the engagement of feet 150 within the reinforced apertures (not explicitly shown), and to the top of handbag 10, e.g., via the apertures 320 and buttons 330 (or other fasteners) disposed about open end 310 thereof.

Figure 3:
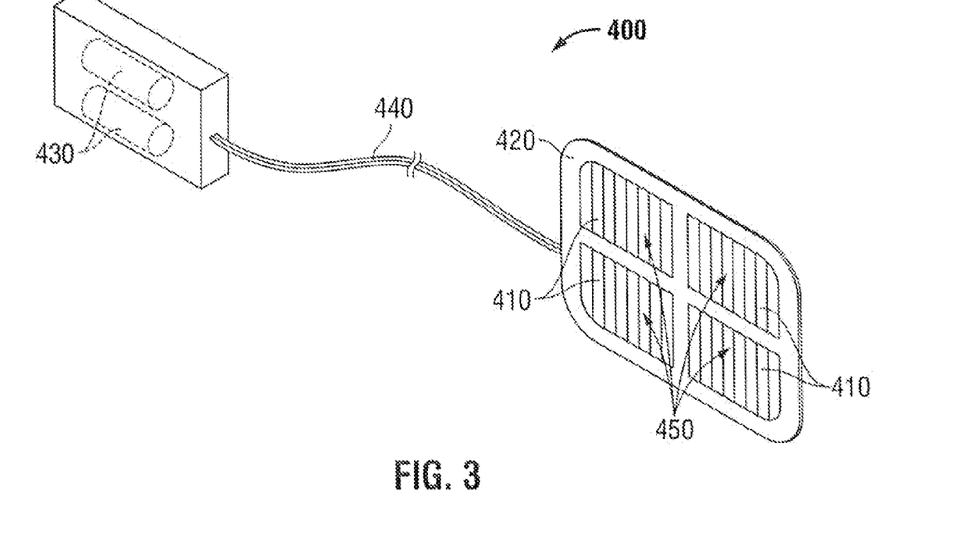
FIG. 3 is a side view of a solar charging unit configured for use with the handbag of FIG. 1A.

Referring now to FIG. 3, in conjunction with FIGS. 1A, 1B and 2, solar charging unit 400 is shown. Solar charging unit 400 generally includes one or more photovoltaic arrays 410, a base 420 for mounting photovoltaic arrays 410 thereon and for securing photovoltaic arrays 410 to frame 100, an energy storage device 430, e.g., one or more batteries 430, and wiring 440 for coupling photovoltaic arrays 410 and energy storage device 430 to one another. Further, a transparent protective covering 450, e.g., liquid glass, may be disposed about photovoltaic arrays 410 to inhibit debris from damaging and/or interfering with the operation of solar charging unit 400. Various different configurations and/or components of solar charging unit 400 are described below and it is envisioned that these configurations and/or components be interchangeable with one another to provide an adaptable and customizable solar charging unit 400 for use with handbag 10. For example, the specific photovoltaic arrays 410 and/or energy storage device 430 used may be interchanged with other photovoltaic arrays 410 and energy storage devices 430 depending on the portable electronic device(s) to be charged, the required charging power or duration of charging, the environment in which handbag 10 will be used, or other factors.

Photovoltaic arrays 410 each include a plurality of solar cells that convert solar energy into electrical energy. Photovoltaic arrays 410 may together cooperate to provide power capability in the range of about 4 W to about 11 W, although other ranges are also contemplated. The solar cells may be formed from monocrystalline silicon, polycrystalline silicon, amorphous silicon, cadmium telluride, copper indium gallium selenide (CIGS), or other suitable materials. It is envisioned that such solar cells be recycled or repurposed from larger capacity photovoltaics, e.g., roof-mounted or stationary freestanding solar panels, either from discarded production, or post-user recycling. Alternatively, organic solar cells, which have the benefit of reduced environmental impact as compared to synthetic solar cells, may be used in place of the recycled solar cells. Further, it is envisioned that the internal electronics and circuitry (not explicitly shown) of photovoltaic arrays 410 and couplings thereof be formed from non-toxic materials and include lead-free solders, e.g., solders formed from tin, copper, silver, bismuth, indium, zinc and/or antimony, as well as lead-free flux. Likewise, lead-free stripping, e.g., copper stripping, preferably couples the photovoltaic arrays 410 to one another.

Continuing with reference to FIGS. 1A, 1B, 2 and 3, photovoltaic arrays 410, as mentioned above, are mounted on a base 420. Base 420 is formed from a non-conductive, natural material, e.g., wood particle board, or may be formed from circuit board (e.g., reclaimed or recycled circuit board). Particle board is advantageous for forming base 420 in that particle board is formed from natural materials, e.g., wood, provides sufficient strength to inhibit substantial bending, flexion, or other manipulation of photovoltaic arrays 410 which may damage photovoltaic arrays 410, is relatively light-weight, and is easily securable to frame 100. More specifically, base 420 may be secured to cork frame 100 via fasteners including hooks and loops, snaps, latches, etc., or any other suitable mechanism, and may be releasably secured thereto for positioning of photovoltaic arrays 410 at any desired position about the outer periphery of frame 100. As can be appreciated, depending on the configuration of handbag 10, different positions of photovoltaic arrays 410 may be advantageous to maximum sunlight exposure and/or for aesthetic purposes. The ability for fasteners (not explicitly shown) engaged to base 420 to releasably engage cork frame 100, e.g., via at least partially penetrating cork frame 100, at various positions facilitates this desired positioning and/or repositioning of photovoltaic arrays 410 for a particular purpose. Alternatively, base 420 may be built into, or fixedly engaged to frame 100.

Wires 440 couple photovoltaic arrays 410 and the circuitry (not shown) thereof to energy storage device 430. More specifically, wires 440 are configured to extend between cork frame 100 and inner lining 200 of handbag 10 to electrically couple photovoltaic arrays 410 and energy storage device 430 to one another. As such, solar energy received by photovoltaic arrays 410 is converted to electrical energy by the photovoltaic arrays 410 and associated circuitry (not shown) and is transmitted along wires 440 to energy storage device 430 for storage. Thus, solar charging unit 400 may provide charging energy to portable electronic devices (not shown) from the energy storage device 430 even when the photovoltaic arrays 410 are not converting energy, e.g., at night or indoors. Suitable energy storage devices 430 include, but are not limited to, hydrofuel cell packs, NiMh battery packs, lithium ion battery packs, and the like. Hydrofuel cells employ proton exchange membrane (PEM) fuel cell technology for storing energy. Hydrofuel cell packs are particular advantageous in that they are clean, reusable energy storage devices that are selectively-operable using a refillable water cartridge. Suitable hydrofuel cell packs for use with handbag 10 include those sold by Horizon Fuel Cell Technologies Pte. Ltd., having business headquarters in Singapore, e.g., the portable energy storage device sold under the tradename "MiniPAK."

Figure 4:
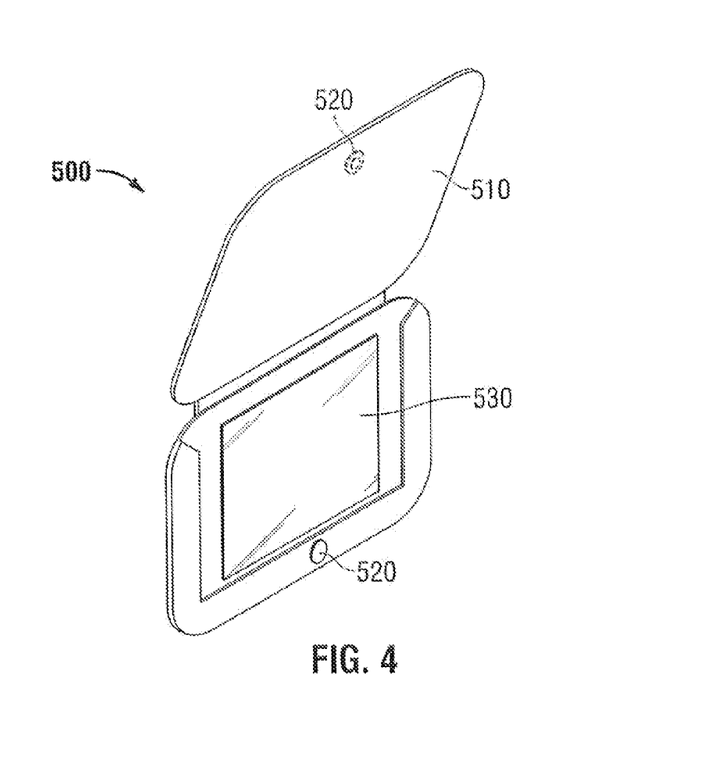
FIG. 4 is a front view of a pocket including a charging unit disposed therein that is configured for use with the handbag of FIG. 1A.

Energy storage device 430 is configured to support charging of at least one portable electronic device (and, preferably, simultaneous charging of multiple devices), e.g., cell phones, PDA's, smartphones, digital music players, cameras, etc. As such, energy storage device 430 may include USB interfacing, or any other standard communication interface (not shown) for connecting the device to be charged to energy storage device 430 for charging. Alternatively, energy storage device 430 may be configured to charge portable electronic devices (not shown) via inductive charging. In such an embodiment, a charging plate 530 (FIG. 4) is provided and the portable electronic device (not shown) to be charged is positioned on, or in close proximity to the charging plate 530 (FIG. 4). In use, a primary coil disposed within the charging plate 530 (FIG. 4), is energized via energy storage device 430 such that a current in a secondary coil disposed within the device to be charged (not shown) is induced to thereby inductively charge the device (not shown). To discontinue charging, the device (not shown) is simply removed from proximity of the charging plate 530 (FIG. 4).

With reference to FIG. 4, in conjunction with FIGS. 1A, 1B and 2, exterior pocket 500 is shown. Exterior pocket 500 is formed from natural materials (e.g., any of the materials mentioned hereinabove). Exterior pocket 500, as shown in FIG. 1B, may be disposed on side wall 138 of frame 100 opposite photovoltaic arrays 410 (disposed on side wall 136 of frame 100 (see FIG. 1A)). However, it is envisioned that exterior pocket 500 and photovoltaic arrays 410 (FIG. 3) be positioned on the same side wall 136, 138, or be otherwise positioned relative to one another in any suitable configuration on frame 100 (FIG. 2). In some embodiments, energy storage device 430 is disposed within, or is positioned adjacent to exterior pocket 500 of handbag 10 and is accessible therefrom. In such an embodiment, pocket 500 is configured to receive one or more portable electronic devices (not shown) therein. As can be appreciated, this configuration facilitates charging of a portable electronic device (not shown) in that, to begin charging, all that is required is that exterior pocket 500 be opened and the portable electronic device (not shown) be inserted into pocket 500 and coupled to energy storage device 430 (FIG. 2). Pocket 500 further includes a cover, or lid 510 including a button, or latch 520 for securely enclosing the portable electronic device (not shown) within pocket 500. Further, in embodiments where inductive charging is provided, charging plate 530 may be disposed within the interior of pocket 500, as shown in FIG. 4, such that positioning the portable electronic device (not shown) within pocket 500 and securing the lid 510 in the closed position retains the portable electronic device (not shown) in close proximity to charging plate 530 such that charging is commenced and continues so long as the portable electronic device (not shown) is disposed within pocket 500. Alternatively, the portable electronic device (not shown) may be positioned within the interior of handbag 10 for charging, e.g., within and interior pocket, or simply at the bottom of handbag 10. In such an embodiment, charging plate 530 (or any other suitable connector, e.g., connection cable 600 (FIG. 5)) may be disposed within the interior of handbag 10 to facilitate charging of the portable electronic device therein. In particular, it is envisioned that charging plate 530 be disposed atop base 130 (FIG. 2) (or form at least a portion of base 130) such that charging may be commenced upon placing one or more portable electronic devices (not shown) at the bottom of handbag 10.

Turning now to FIGS. 1A, 1B, 2, 3 and 4, and in particular to FIG. 2, the assembly of handbag 10 is described. Initially, the specific components to be used with solar charging unit 400 are determined and are coupled to one another. For example, organic solar cell arrays 410 may be coupled to base 420 and wires 440 may be used to couple the organic solar cell arrays 410 to hydrofuel cell energy storage device 430, which is disposed within pocket 500. Thereafter, base 420 (including arrays 410 thereon) and pocket 500 (including energy storage device 430 therein) are secured to frame 100. As shown in FIGS. 1A and 1B, base 420 and arrays 410 are generally centrally disposed on side wall 136 of frame 100, while energy storage device 430 is disposed within pocket 500 on side wall 138 of frame 100. However, as mentioned above, the components of solar charging unit 400 may be disposed in any suitable configuration about frame 100. The penetrability of cork frame 100 facilitates the engagement of solar charging unit 400 and pocket 500 via fasteners (not explicitly shown) at any position thereon, although it is also envisioned that solar charging unit 400 and pocket 500 may be secured to frame 100 via any other suitable mechanism. Alternatively, as mentioned above, solar charging unit 400 and pocket 500 may be permanently embedded within cork frame 100.

With the electronic components of handbag 10 secured to frame 100, inner lining 200 may be inserted into frame 100 and outer jacket 300 may be disposed about frame 100. Both inner lining 200 and outer jacket 300 are configured to extend beyond open end 160 of frame for engagement with one another. More specifically, as mentioned above, inner lining 200 and outer jacket 300 include complementary apertures 220, 320 and/or buttons, e.g., buttons 330, respectively, for buttoning inner lining 200 and outer jacket 300 to one another about frame 100, thus securing inner lining 200 and outer jacket 300 about frame 100. Alternatively, a ribbon (not shown) may be weaved through apertures 220, 320 defined within both inner lining 200 and outer jacket 300 to secure inner lining 200 and outer jacket 300 about frame 100. Other releasable engagement mechanisms, e.g., fasteners (not shown), are also contemplated. As assembled, as shown in FIGS. 1A and 1B, solar charging unit 400 and external pocket 500 extend through windows 340, 350, respectively, defined within outer jacket 300 and feet 150 extend from base 130 of frame 100 through apertures (not explicitly shown) defined within outer jacket 300.

Figure 5:
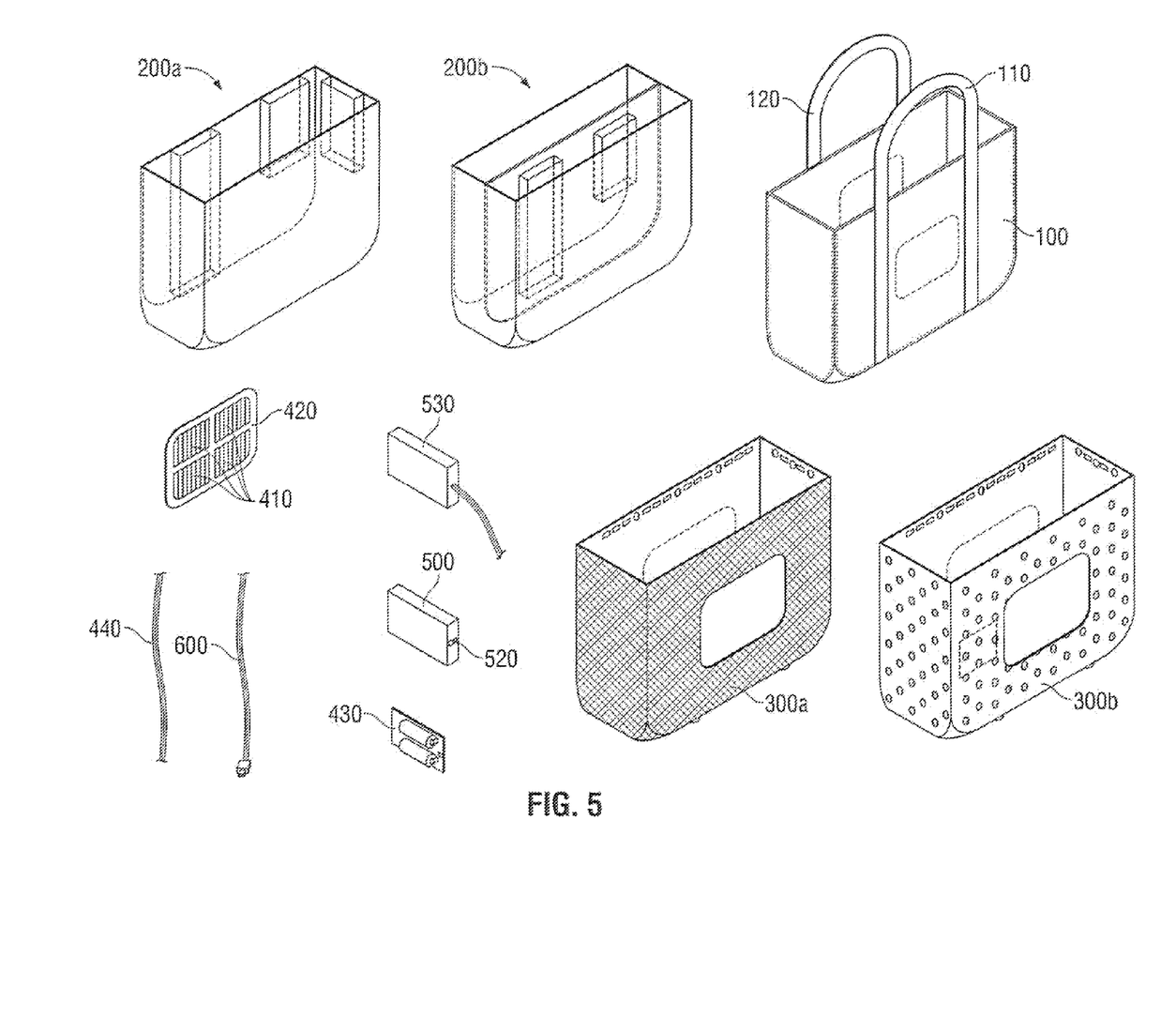
FIG. 5 is a schematic illustration of a handbag kit provided in accordance with the present disclosure, the kit including various components for customizing the handbag to a desired configuration.

FIG. 5 shows a handbag kit 20 provided in accordance with embodiments of the present disclosure. Kit 20 provides the user with the ability to customize handbag 10 as desired for a particular use or occasion. As can be appreciated, a handbag 10 including various different interchangeable components not only permits customization, but also obviates the need to have different handbags for various different purposes. Further, given the portable electronic device charging capabilities of handbag 10, interchangeability is even more desirable in that, it is not likely that one would invest in multiple solar charging handbags in order to obtain a wide range of styles and/or configurations thereof, not to mention the environmental impact of requiring multiple handbags for each different purpose.

Continuing with reference to FIG. 5, handbag kit 20 includes frame 100 having first and second carrying straps 110, 120 secured thereto. Different frames 100 may also be provided. For example, frames 100 of different size and/or shape, or frames formed from different materials may be provided, thus allowing the user to select a desired frame 100. Further, as mentioned above, carrying straps 110, 120 may be interchangeable such that desired carrying straps 110, 120 may be selected for use in accordance with a particular bag configuration to be used, e.g., carrying straps 110, 120 having a particular size, shape, color, or formed from a particular material. Once the user has selected a particular frame 100 (and carrying straps 110, 120), as will become more apparent in view of the following, any different combination of inner linings 200 (FIG. 2), outer jackets 300 (FIG. 3) and/or solar charging units 400 or the components thereof may be coupled to frame 100 to form a handbag having a desired configuration.

Handbag kit 20 further includes two exemplary outer jackets 300a, 300b that may be selected for use. As can be appreciated, kit 20 may include greater than two jackets 300a, 300b of varying configuration, e.g., different patterns, colors and/or materials, for providing more options to the user. Handbag kit 20 further includes two exemplary inner linings 200a, 200b (although more may be provided) that may be selected for use. Inner linings 200a, 200b may be used in conjunction with either of the outer jackets 300a, 300b. The ability to interchangeably use different inner linings 200a, 200b is advantageous in that a different configuration of the lining may be selected according to the particular purpose. For example, lining 200a may be selected where a larger open spaced, with only a few small compartments is desired. On the other hand, lining 200b may be selected where it is desired to divide the bag into two large compartments, one having an open space, and the other having a plurality of minor compartments. As can be appreciated, different configurations including various pockets, dividers, and the like may be provided, depending on a particular purpose.

Further, it is envisioned that third party, or homemade inner linings and/or outer jackets be adapted for use with handbag 10. As such, the user may create unique and personalized inner linings and/or outer jackets out of clothing, fabrics, textiles, or other materials, or may create various different inner linings and/or outer jackets out of other recycled or reused materials, as desired. In fact, all that is required is sufficient material to extend beyond open end 160 (FIG. 2) of frame 100 for securing the inner lining 200 (FIG. 2) and outer jacket 300 (FIG. 2) to one another. Buttons and slots, aperture and ribbon, or other suitable engagement mechanisms may then be used to secure the inner lining 200 (FIG. 2) and outer jacket 300 (FIG. 2) to one another about frame 100.

With continued reference to FIG. 5, handbag kit 20 further includes various different electrical components engagable with frame 100 and configured for use with solar charging unit 400. In particular, kit 20 includes one or more photovoltaic arrays 410, one or more battery charging devices 430, a pocket 500, a inductive charging plate 530, one or more connection cables 600 (e.g., a USB cable), and wires 440. However, it is also envisioned that solar charging unit 400 come pre-assembled, or engaged to frame 100 and that only inner lining 200 (FIG. 2) and outer jacket 300 (FIG. 2) be replaceable therefrom. In such an embodiment, the components, of solar charging unit 400 may still be replaced except that, rather than replacing the entire solar charging unit 400 or component thereof, photovoltaic arrays 410 may be decoupled from base 420 and replaced with different photovoltaic arrays 410, while base 420 remained engaged to frame 100 and/or energy storage device 430 may be removed from pocket 500 and replaced with another energy storage device 430, while pocket 500 remains engaged to frame 100.

Figure 6A:
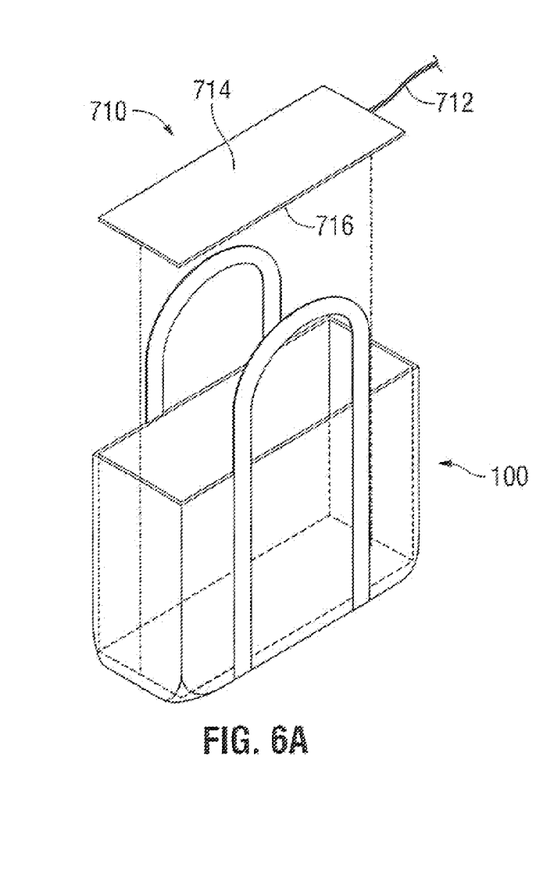
FIG. 6A is a side, perspective view of the handbag of FIG. 1A including a refrigeration element configured for use therewith.
Figure 6B:
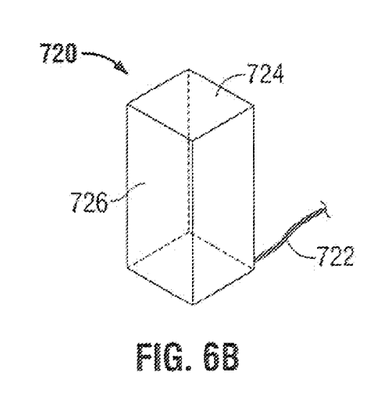
FIG. 6B is side, perspective view of another embodiment of a refrigeration element configured for use with the handbag of FIG. 1A.
Figure 6C:
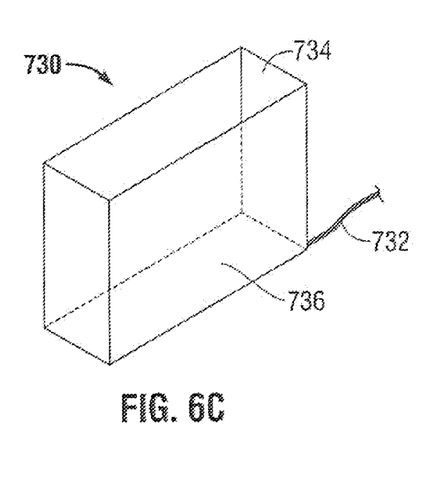
FIG. 6C is a side, perspective view of another embodiment of a refrigeration element configured for use with the handbag of FIG. 1A.

Referring now to FIGS. 6A-6C, various embodiments of refrigeration elements 710, 720, 730 for refrigerating a portion of or the entire bag 10 are shown. Refrigeration elements 710, 720, 730 may each be formed from thermoelectric (Peltier) cooling pads that are electrically coupled to energy storage device 430 (FIG. 2) via cables 712, 722, 732, respectively, for providing refrigeration to the area within or about refrigeration elements 710, 720, 730. More specifically, thermoelectric cooling elements 710, 720, 730 use energy from energy storage device 430 (FIG. 2) to create a thermoelectric heat pump which actively transfers heat from one side 714, 724, 734 thereof (i.e., the "cold side") to the other side 716, 726, 736 thereof (i.e., the "hot side"), thereby providing refrigeration within the vicinity of the cold side 714, 724, 734, respectively, thereof. Alternatively, refrigeration elements 710, 720, 730 may incorporate other refrigeration technologies, e.g., vapor-compression refrigeration.

Continuing with reference to FIGS. 6A-6C, and initially to FIG. 6A, refrigeration element 710 is configured for positioning about base 130 (FIG. 2) of bag 10, thus, forming the bottom, or base of the interior portion of bag 10 (with cold side 714 thereof upwardly-facing). As such, food, drink, etc. placed at or near the bottom of bag 10 may be maintained in a cooled state. Refrigeration element 720, on the other hand, as shown in FIG. 6B, defines a sleeve-like configuration that is positionable within bag 10. The interior surface of refrigeration element 720 comprises the cold side 724 thereof, thus refrigerating a bottle, can, or other generally elongated food or beverage therein. Refrigeration element 730 is similar to refrigeration 720 except that refrigeration element 730 is dimensioned similarly to frame 100 such that the entire bag 10 may be used as a refrigerator. As can be appreciated, in any of these embodiments, a cover, or lid (not shown) may be provided for fully enclosing bag 10 (or the internal compartments thereof) to facilitate refrigeration. Further, the insulative properties of cork frame 100 (FIG. 2) facilitate the refrigeration of food and/or drink disposed within bag 10.

From the foregoing and with reference to the various figure drawings, those skilled in the art will appreciate that certain modifications can also be made to the present disclosure without departing from the scope of the same. While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed:

1. A kit, comprising:
   a bag frame;
   a plurality of inner linings, each inner lining defining a different configuration and configured for positioning within the frame;
   a plurality of outer jackets, each outer jacket defining a different configuration and configured for positioning about the frame, each of the outer jackets configured to engage each of the inner linings for engaging the outer jacket and inner lining to one another about the bag frame; and
   a solar charging unit, including:
      at least one solar cell array mountable on the frame;
      at least one energy storage device mountable on the frame; and
      at least one connection member for coupling at least one portable electronic device to the solar charging unit for charging.

2. The kit according to claim 1, wherein one of the connection members is an inductive charging plate.

3. The kit according to claim 1, further comprising at least one pocket mountable on the frame, the at least one pocket configured to receive the at least one portable electronic device therein to facilitate charging of the at least one portable electronic device.

4. The kit according to claim 1, wherein the frame is formed from cork to facilitate mounting the at least one solar cell array and the at least one energy storage device thereto.

* * * * *